(12) United States Patent
Schellaars

(10) Patent No.: US 12,145,793 B2
(45) Date of Patent: Nov. 19, 2024

(54) TANK ASSEMBLY AND HELICOPTER

(71) Applicant: Helitak Fire Fighting Equipment Pty Ltd, Noosaville (AU)

(72) Inventor: Jason Schellaars, Noosaville (AU)

(73) Assignee: Helitak Fire Fighting Equipment Pty Ltd, Lake MacDonald (AU)

( * ) Notice: Subject to any disclaimer, the term of this patent is extended or adjusted under 35 U.S.C. 154(b) by 493 days.

(21) Appl. No.: 17/414,484

(22) PCT Filed: Dec. 3, 2019

(86) PCT No.: PCT/AU2019/051315
§ 371 (c)(1),
(2) Date: Jun. 16, 2021

(87) PCT Pub. No.: WO2020/124129
PCT Pub. Date: Jun. 25, 2020

(65) Prior Publication Data
US 2022/0055829 A1 Feb. 24, 2022

(30) Foreign Application Priority Data

Dec. 18, 2018 (AU) .............................. 2018904807

(51) Int. Cl.
*B65D 88/24* (2006.01)
*A62C 3/02* (2006.01)
(Continued)

(52) U.S. Cl.
CPC ............ *B65D 88/24* (2013.01); *A62C 3/0235* (2013.01); *B64C 27/04* (2013.01); *B64D 1/16* (2013.01); *B65D 88/005* (2013.01)

(58) Field of Classification Search
CPC ......... B64D 1/16; A62C 35/00; A62C 35/023; A62C 35/026; A62C 35/04; B65D 88/24; B65D 88/005
See application file for complete search history.

(56) References Cited

U.S. PATENT DOCUMENTS 3,072,371 A * 1/1963 Doyle ....................... B28C 5/42
366/184
3,273,651 A * 9/1966 Andrews .............. A62C 3/0235
169/53
(Continued)

OTHER PUBLICATIONS

"Technical Manual. Aviation Unit and Aviation Intermediate Maintenance Manual. CH-47D Helicopter." TM 55-1520-240-23-10. Headquarters, Department of the Army. Sep. 19, 2002. (Year: 2002).*

(Continued)

*Primary Examiner* — Philip J Bonzell
*Assistant Examiner* — Michael B. Kreiner
(74) *Attorney, Agent, or Firm* — William A. English; Vista IP Law Group LLP

(57) ABSTRACT

A tank assembly for a helicopter is provided. The tank assembly comprises a retractable tank for storing liquid or other substances, an attachment mechanism, and first and second struts. The retractable tank comprises an upper frame structure. The attachment mechanism is attached to the upper frame structure and is configured to engage a cargo hook mount on the underside of the fuselage of the helicopter. The first and second struts extend from respective opposing sides of the upper frame structure. Each of the first and second struts is configured to engage a respective side mount on the fuselage of the helicopter.

16 Claims, 10 Drawing Sheets

(51) Int. Cl.
  *B64C 27/04* (2006.01)
  *B64D 1/16* (2006.01)
  *B65D 88/00* (2006.01)

(56) References Cited

U.S. PATENT DOCUMENTS

| | | | | |
|---|---|---|---|---|
| 3,661,211 | A * | 5/1972 | Powers | B64D 1/16 169/53 |
| 3,714,987 | A * | 2/1973 | Mattson | B64D 1/16 169/53 |
| 4,090,567 | A * | 5/1978 | Tomlinson | B64D 1/16 169/53 |
| 4,971,082 | A * | 11/1990 | Kovaletz | B24C 3/32 134/42 |
| 4,973,361 | A * | 11/1990 | Kovaletz | B64D 1/16 134/42 |
| 5,248,436 | A * | 9/1993 | Kovaletz | B24C 3/06 210/924 |
| 6,209,593 | B1 * | 4/2001 | Nichols, Sr. | B64D 1/16 141/2 |
| 6,981,554 | B1 * | 1/2006 | Klump | A62C 35/02 220/666 |
| 9,504,862 | B2 * | 11/2016 | Sempere Rodriguez | A62C 3/0242 |
| 9,914,000 | B2 * | 3/2018 | Black | A62C 3/0235 |
| 10,406,390 | B2 * | 9/2019 | Zimmerman | A62C 3/0242 |
| 11,046,433 | B2 * | 6/2021 | Trotter | E05F 15/63 |
| 11,123,587 | B2 * | 9/2021 | Schnarr | B01F 25/314 |
| 2006/0175429 | A1 * | 8/2006 | Lanigan, Jr. | B64D 1/16 169/53 |
| 2008/0314601 | A1 * | 12/2008 | Cafferata | A62C 3/0235 169/34 |
| 2010/0018725 | A1 * | 1/2010 | Ramos Rodriguez | A62C 3/0235 169/53 |
| 2010/0178176 | A1 * | 7/2010 | Kenyon | B64D 1/22 169/53 |
| 2017/0080267 | A1 * | 3/2017 | Wagner | A62C 3/0242 |
| 2019/0299040 | A1 * | 10/2019 | Schnarr | A62C 3/0228 |

OTHER PUBLICATIONS

"Technical Manual. Operator's Manual for UH-60A Helicopter, UH-60L Helicopter, EH-60A Helicopter." TM 1-1520-237-10. Headquarters, Department of the Army. Oct. 31, 1996. (Year: 1996).*

"Technical Manual. Operatorâs Manual for UH-60A Helicopter, UH-60L Helicopter, EH-60A Helicopter." TM 1-1520-237-10. Headquarters, Department of the Army. Oct. 31, 1996. (Year: 1996).*

Australian Government IP Office, Examination Report for corresponding Australian Application No. 2019409867, Jan. 31, 2023, 4 pages.

Helitak FT4500 UH60 S70i Sikorsky Blackhawk, Image from internet webpage (retrieved from URL; https://web.archive.org/web/w0180916142807/http:..helitak.com.au/wp-content/uploads/2018/05/FT4400-UH60-Blackhawk.pdf on Jan. 30, 2020), published Sep. 16, 2018, 2 pages.

Screenshot from URL:https://www.youtube.com/watch?v=jeU0zAkydGw listing videos sited in Australian Examination Report, retrieved on Apr. 3, 2023, 3 pages.

Bill Gabbert, Collapsible Belly Tank for a Blackhawk, from https://fireaviation.com/2013/05/01/collapsible-belly-tank-for-a-blackhawk/, published on May 1, 2013, retrieved on Apr. 3, 2023, 4 pages.

Helitak FT4500 UH60 S70i Sikorsky Blackhawk [retrieved from internet on Jan. 30, 2020] <URL: https://web.archive.org/web/20 I 80916142807 /http:/ /helitak.com.au/wp-content/uploads/2018/05/ FT 4400-UH60-Blackhawk.pdf> published on Sep. 16, 2018 as per Wayback Machine.

Helitak Fire Fighting Tanks [retrieved from internet on Jan. 30, 2020] <URL: https://www.youtube.com/watch?v=JeU0zAkydGw> published on Sep. 6, 2017.

Fire Aviation, 'Collapsible belly tank for a Blackhawk' [retrieved from internet on Jan. 30, 2020] <URL: https://fireaviation.com/2013/05/01/collapsible-belly-tank-for-a-blackhawk/> published on Jan. 5, 2013.

International Search Report, Australian Patent Office, Feb. 3, 2020.
Written Opinion of International Searching Authority, Australian Patent Office, Feb. 3, 2020.

* cited by examiner

TANK ASSEMBLY AND HELICOPTER

CROSS REFERENCE TO RELATED APPLICATION

This application is for entry into the U.S. National Phase under § 371 for International Application No. PCT/AU2019/051315 having an international filing date of Dec. 3, 2019, and from which priority is claimed under all applicable sections of Title 35 of the United States Code including, but not limited to, Sections 120, 363, and 365 (c) and which in turn claims priority under 35 USC 119 to Australian Patent Application No. 2018904807 filed on Dec. 18, 2018.

TECHNICAL FIELD

The present disclosure relates to a tank assembly for a helicopter, and more particularly, a tank assembly comprising a retractable tank for storing liquid or other substances. The present disclosure also relates to a helicopter with a tank assembly attached thereto, the tank assembly comprising a retractable tank for storing liquid or other substances.

BACKGROUND

The Sikorsky Black Hawk helicopter (for example, the Sikorsky UH-60, S-70, S-70i, S-70A, S-70B, and S-70C) is a front-line utility helicopter typically used in military forces around the world for air assault, air cavalry and medical evacuation operations. However, in recent years, Black Hawk helicopters have become popular for use in civilian operations including aerial firefighting and cargo transportation due to their high lifting capacities, flexible configuration and manoeuvrability.

Black Hawk helicopters are equipped with a cargo hook, which is a device mounted to a cargo hook mount disposed on the underside of the fuselage that allows for the transportation of external payloads during flight. Whilst Black Hawk helicopters are capable of lifting in excess of 10,000 pounds (4,500 kilograms), current cargo hooks only typically provide Black Hawk helicopters with a maximum lifting capacity of 8,000 pounds (3,600 kilograms).

Currently, Black Hawk helicopters' firefighting capabilities are either in the form of an underslung long-line bucket system or an internal tank system. The bucket system typically comprises a bucket containing fire retardant material or water that is suspended solely from the cargo hook of the Black Hawk helicopter via one or more long cables. A disadvantage of the bucket system is that it cannot exceed the maximum load capacity of 8,000 pounds allowed by the cargo hook. A further disadvantage is that the long cables of the bucket system often limit the manoeuvrability of the Black Hawk helicopter and can pose a potential risk of entanglement with trees and other objects during flight.

The internal tank system typically comprises a tank containing water or fire retardant material that is fitted in the cargo compartment of the Black Hawk helicopter. Such a system does not rely on the cargo hook, thus allowing the maximum lifting capacity of Black Hawk helicopters to exceed the 8,000 pound limit allowed by the cargo hook. However, a disadvantage of internal tank systems is that they require significant and expensive modifications to be made to the Black Hawk helicopter so as to fit the tank into the cargo compartment. A further disadvantage is that the tank occupies significant real-estate in the cargo compartment of the Black Hawk helicopter, thus limiting or eliminating the use of the cargo compartment for other purposes such as transporting persons or cargo, for example.

Object

It is an object of the present disclosure to substantially overcome or ameliorate one or more of the above disadvantages, or at least provide a useful alternative.

SUMMARY

In accordance with an aspect of the present disclosure, there is provided a tank assembly for a helicopter, the tank assembly comprising:

a retractable tank for storing liquid or other substances, the retractable tank comprising an upper frame structure;

an attachment mechanism attached to the upper frame structure and configured to engage a cargo hook mount on the underside of the fuselage of the helicopter; and first and second struts extending from respective opposing sides of the upper frame structure, each of the first and second struts being configured to engage a respective side mount on the fuselage of the helicopter.

The upper frame structure may have a forward end and a rearward end, and the first and second struts may be spaced forwardly from the attachment mechanism.

The attachment mechanism may have a body and first and second opposing mounting arm portions extending from the body. Each of the first and second opposing mounting arm portions may be configured to be fixedly received in respective first and second opposing couplers of the cargo hook mount.

Each of the first and second struts may be hingedly attached to a respective opposing side of the upper frame structure.

The retractable tank may further comprise a moveable lower frame structure and a flexible bag connected to the upper and lower frame structures. The lower frame structure may be moveable between a first retracted position in which the lower frame structure is substantially within or adjacent the upper frame structure, and a second extended position in which the lower frame structure is spaced from the upper frame structure such that a volume is defined within the flexible bag for storing liquid or other substances.

The lower frame structure may be biased to the first retracted position and may move towards the second extended position in response to the amount of liquid or other substance in the volume of the flexible bag.

The lower frame structure may be biased to the first retracted position by a retraction system engaged with the upper and lower frame structures.

In accordance with another aspect of the present disclosure, there is provided a helicopter comprising:

a fuselage having an underside and opposing sides;

two opposing side mounts disposed respectively on the opposing sides of the fuselage;

a cargo hook mount disposed on the underside of the fuselage; and a tank assembly comprising:

a retractable tank for storing liquid or other substances, the retractable tank comprises an upper frame structure;

an attachment mechanism attached to the upper frame structure and engaged with the cargo hook mount; and first and second struts extending from respective opposing sides of the upper frame structure, each of the first and second struts being engaged with a respective side mount.

The upper frame structure may have a forward end and a rearward end, and the first and second struts may be spaced forwardly from the attachment mechanism.

The cargo hook mount may comprise first and second opposing couplers. The attachment mechanism may have a body and first and second opposing mounting arm portions extending from the body. Each of the first and second opposing mounting arm portions may be fixedly received in respective first and second opposing couplers.

Each of the first and second struts may be hingedly attached to a respective opposing side of the upper frame structure.

Each of the side mounts may define an aperture, and a free end portion of each of the first and second struts may define at least one aperture.

The helicopter may further comprise two or more fasteners for securing the first and second struts to respective side mounts. The apertures of the first and second struts and the apertures of the side mounts may be respectively aligned and secured by respective fasteners.

Each of the side mounts may be an External Stores Support System (ESSS) mount.

The helicopter may be a Black Hawk or Sea Hawk helicopter.

The retractable tank may further comprise a moveable lower frame structure and a flexible bag connected to the upper and lower frame structures. The lower frame structure may be moveable between a first retracted position in which the lower frame structure is substantially within or adjacent the upper frame structure, and a second extended position in which the lower frame structure is spaced from the upper frame structure such that a volume is defined within the flexible bag for storing liquid or other substances.

The lower frame structure may be biased to the first retracted position and may move towards the second extended position in response to the amount of liquid or other substance in the volume of the flexible bag.

The lower frame structure may be biased to the first retracted position by a coil spring engaged with the upper and lower frame structures.

BRIEF DESCRIPTION OF DRAWINGS

Embodiments of the present disclosure will now be described hereinafter, by way of examples only, with reference to the accompanying drawings, in which.

DESCRIPTION OF EMBODIMENTS

Figure 1:
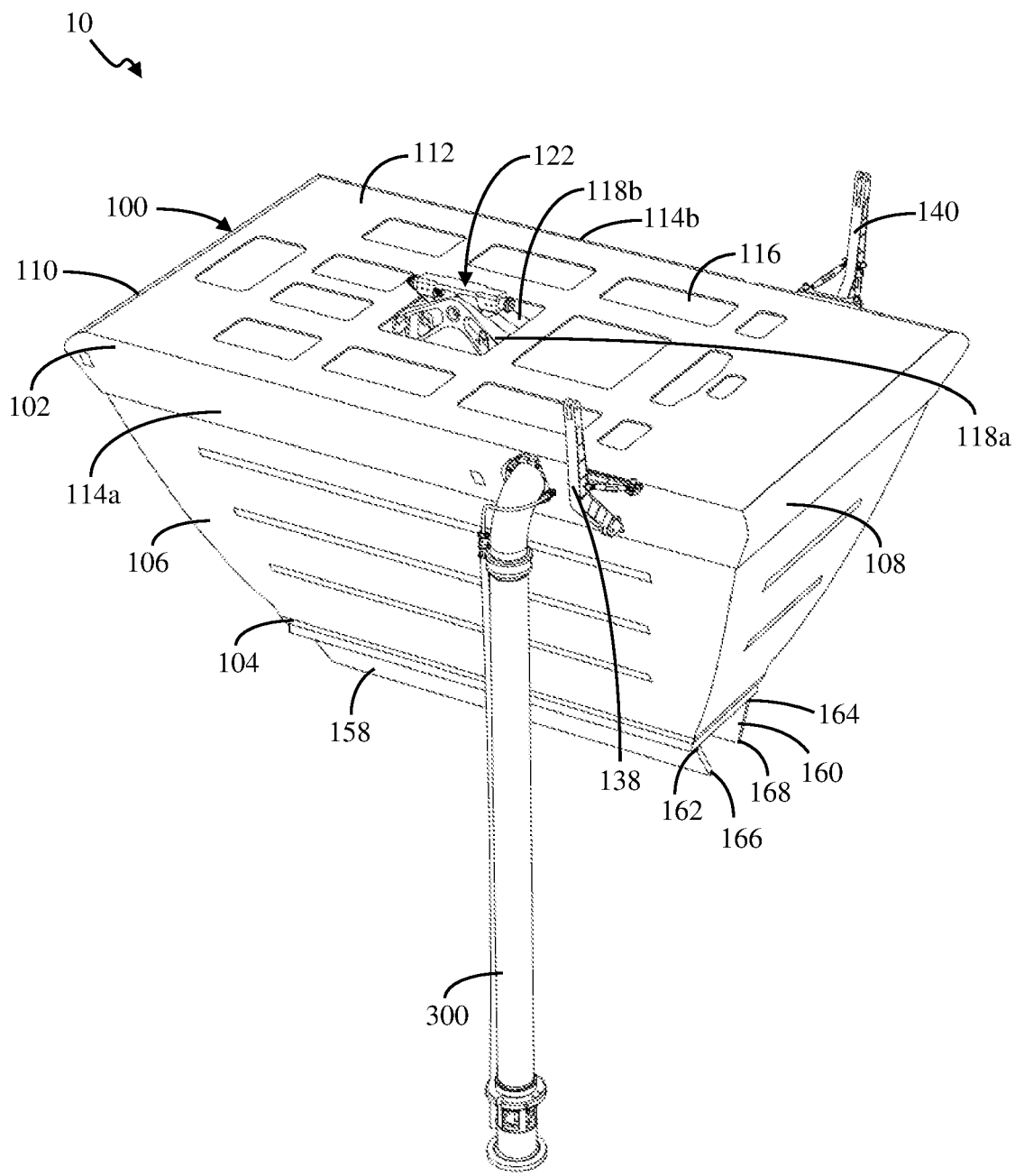
FIG. 1 is a perspective view of an embodiment of a tank assembly, with a lower frame structure of the tank assembly being in a second extended position and bomb doors open.
Figure 2:
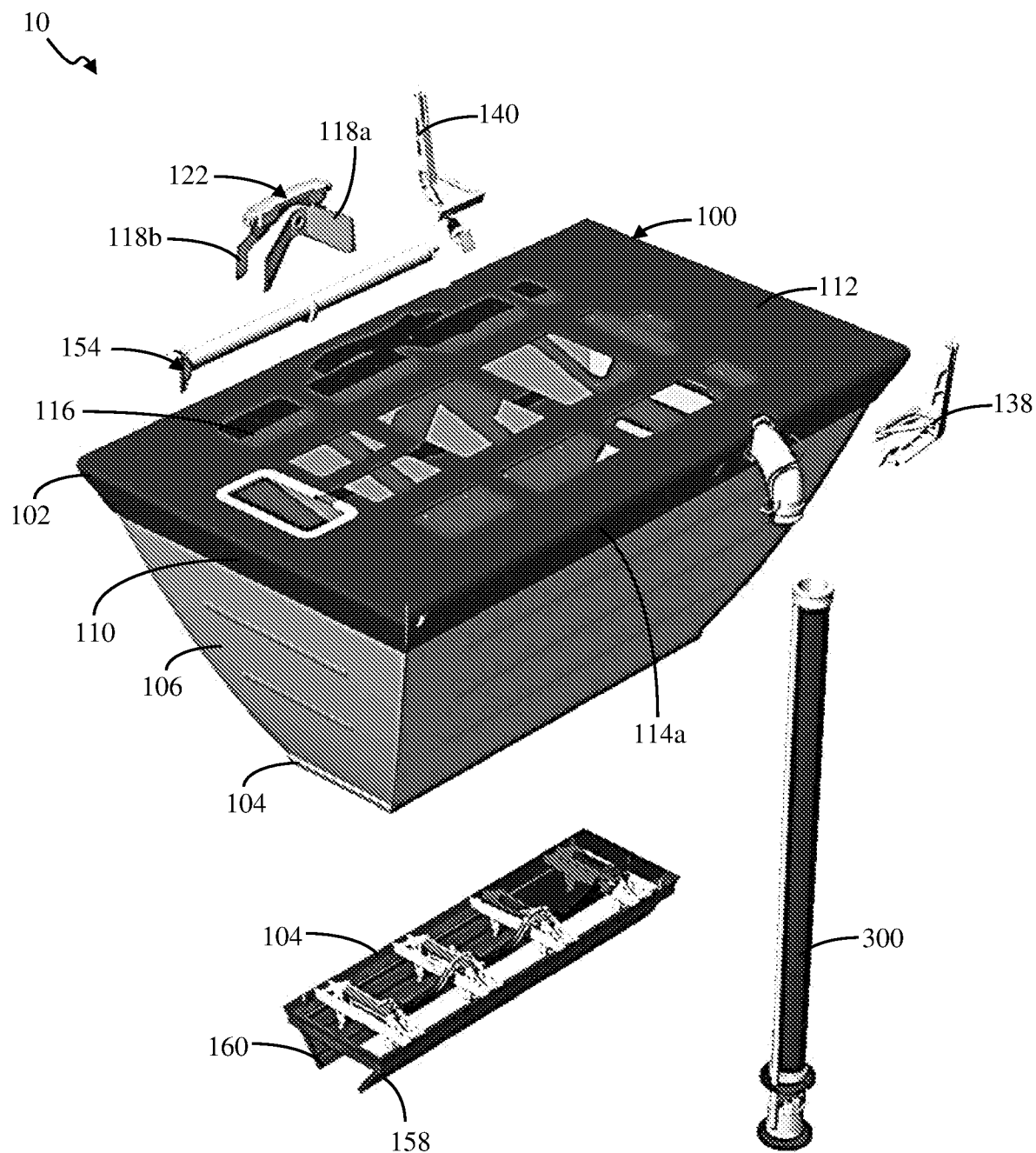
FIG. 2 is an exploded view of the tank assembly of FIG. 1.
Figure 3:
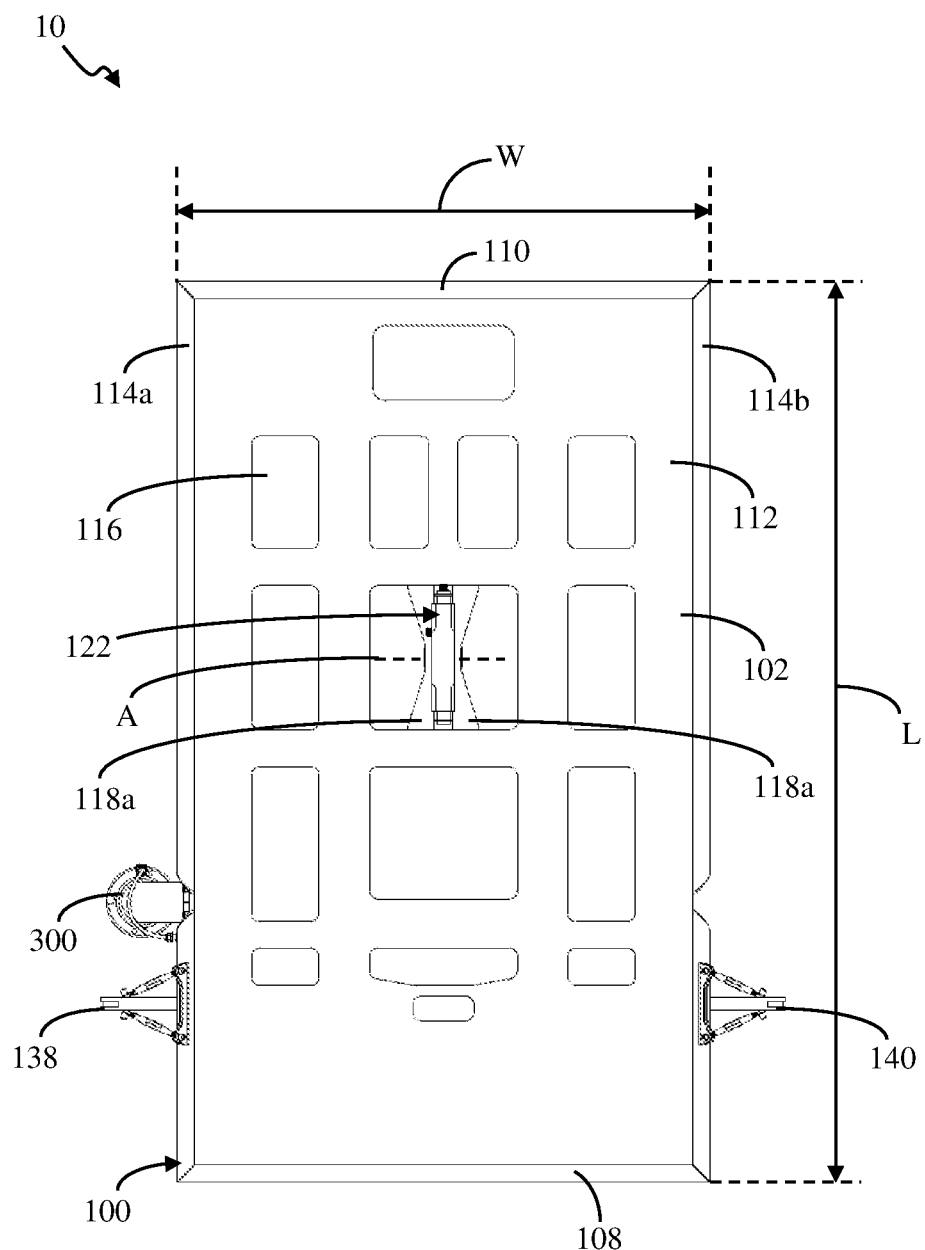
FIG. 3 is a top view of the tank assembly of FIG. 1.

FIGS. 1 to 3 show an embodiment of a tank assembly 10 for a helicopter 20. The tank assembly 10 comprises a retractable tank 100 for storing liquid or other substances such as water or fire retardant material, for example. The retractable tank 100 comprises an upper frame structure 102, a moveable lower frame structure 104 and a flexible bag 106, in the form of a funnel-shaped bellows, which is connected to the upper and lower frame structures 102, 104. The upper frame structure 102 has a forward end 108, a rearward end 110, an upwardly-facing surface 112 and two opposed side surfaces 114a, 114b. In this embodiment, the upper frame structure 102 defines a length L of about 3,400 mm (11 feet) and a width W of about 2,000 mm (6.5 feet). The upwardly-facing surface 112 defines a plurality of openings 116. Further, the upper frame structure 102 has two attachment members 118a, 118b extending upwardly from the upwardly-facing surface. In this embodiment, each of the attachment members 118a, 118b is in the form of arch beams defining an aperture 120a, 120b. The upper and lower frame structures 102, 104 are formed from carbon fibre material or the like.

Figure 4:
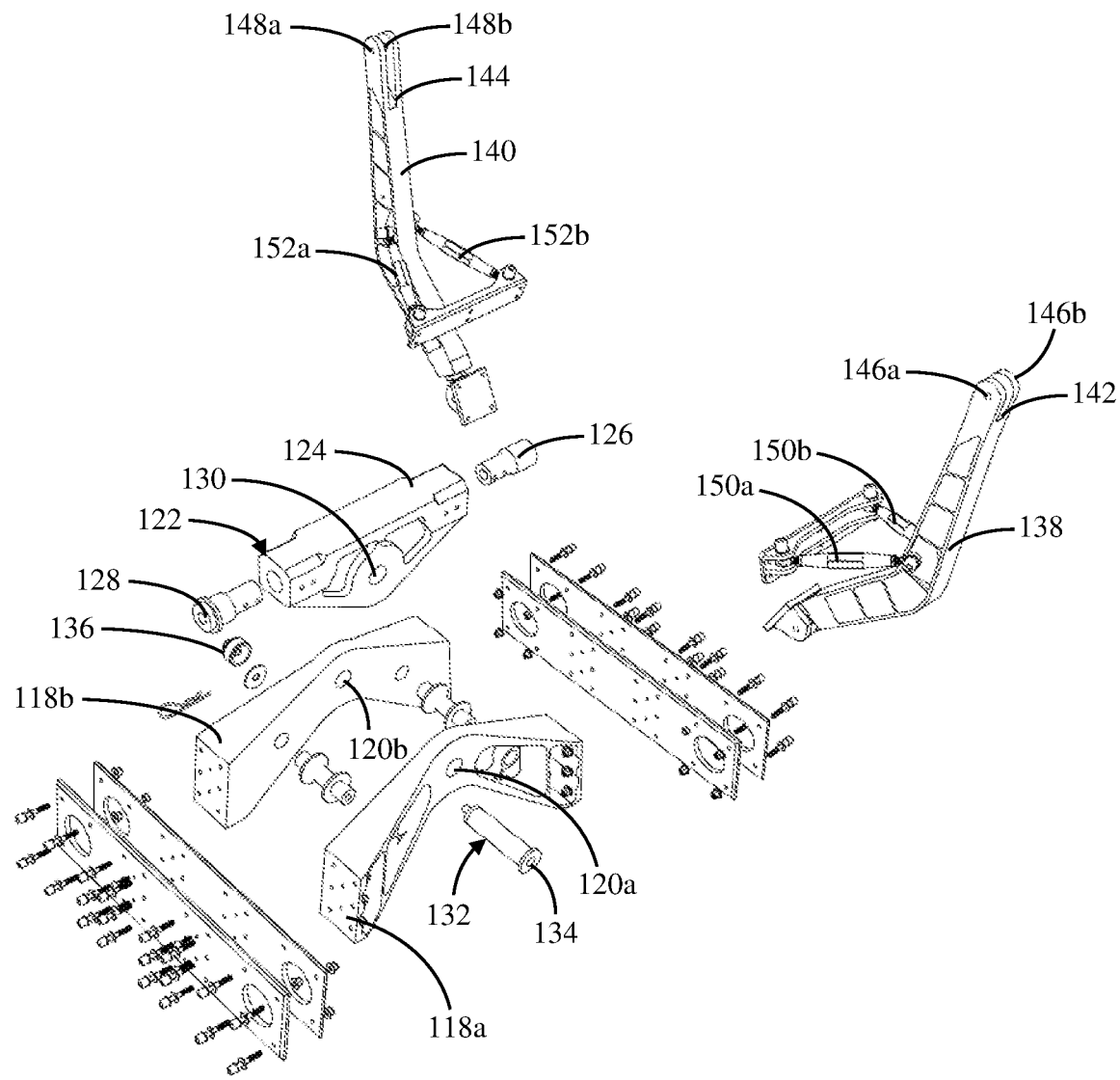
FIG. 4 is an exploded view of an attachment mechanism, attachment members, and first and second struts of the tank assembly of FIG. 1.

The tank assembly 10 also comprises an attachment mechanism 122 configured to engage a cargo hook mount 208 on the underside of the fuselage 200 of the helicopter 20. With reference to FIG. 4, the attachment mechanism 122 comprises a body 124 and first and second mounting arm portions 126, 128, in the form of pins, that respectively extend outwardly from opposed ends of the body 124. Each of the mounting arm portions 126, 128 is configured to engage with the cargo hook mount 208 of the helicopter 20 for fixed attachment. The body 124 defines an aperture 130 therein and is fixed to the attachment members 118a, 118b by a fastener 132. In this embodiment, the fastener 132 comprises a connecting pin 134 that transversely extends through each of the apertures 120a, 120b of the attachment members 118a, 118b and the aperture 130 of the body 124, and a locking mechanism 136 that engages with the connecting pin 134 to secure the body 124 of the attachment mechanism 122 to the attachment members 118a, 118b. Engagement of the connecting pin 134 and the aperture 130 of the body 124 allows the attachment mechanism 122 to rotate about an axis A, as best shown in FIG. 3. The attachment members 118a, 118b and the attachment mechanism 122 are formed from aluminium such as 6061-T6 aluminium, for example, or the like.

The tank assembly 10 further comprises first and second struts 138, 140 that are each configured to engage a respective side mount 206 on the fuselage 400 of the helicopter 20. Each of the struts 138, 140 is hingedly attached to a respective opposing side surfaces 114a, 114b of the upper frame structure 102 and extends upwardly from the upper frame structure 102 to a free end portion 142, 144. In this embodiment, the first and second struts 138, 140 are spaced forwardly from the attachment mechanism 122. Each of the free end portions 142, 144 also defines at least one aperture 146, 148. In this embodiment, each of the free end portions 142, 144 is in the form of a clevis with two opposed apertures 146a, 146b 148a, 148b as best shown in FIG. 4. Further, the tank assembly 10 comprises four adjustment mechanisms 150a, 150b, 152a, 152b that are attached to the upper frame structure 102 and respective struts 138, 140. Each of the adjustment mechanisms 150a, 150b, 152a, 152b is configured to allow a user to move the respective free end portions 142, 144 of the struts 138, 140 relative to the upper frame structure 102. In this embodiment, each of the adjustment mechanisms 150a, 150b, 152a, 152b is in the form of a turnbuckle. The first and second struts 138, 140 are formed from aluminium such as 6061-T6 aluminium, for example, or the like.

Figure 5:
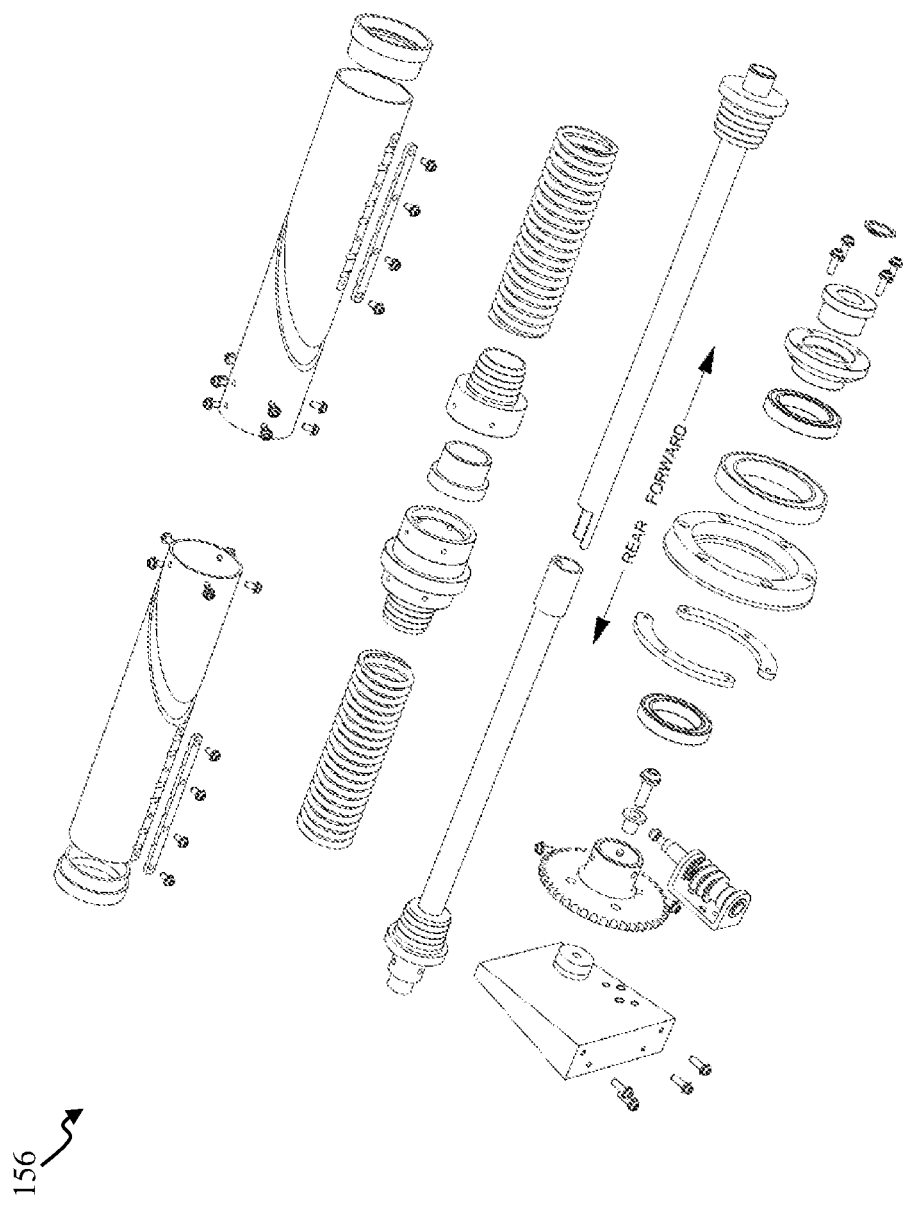
FIG. 5 is an exploded view of a coil spring mechanism of a retraction system of the tank assembly of FIG. 1.

Moreover, the tank assembly 10 comprises a retraction system 154 having a coil spring mechanism 156 (FIG. 5) connected to the upper frame structure and a pulley system (not shown) operatively connected to the coil spring mechanism 156 and the lower frame structure 104.

Figure 6:
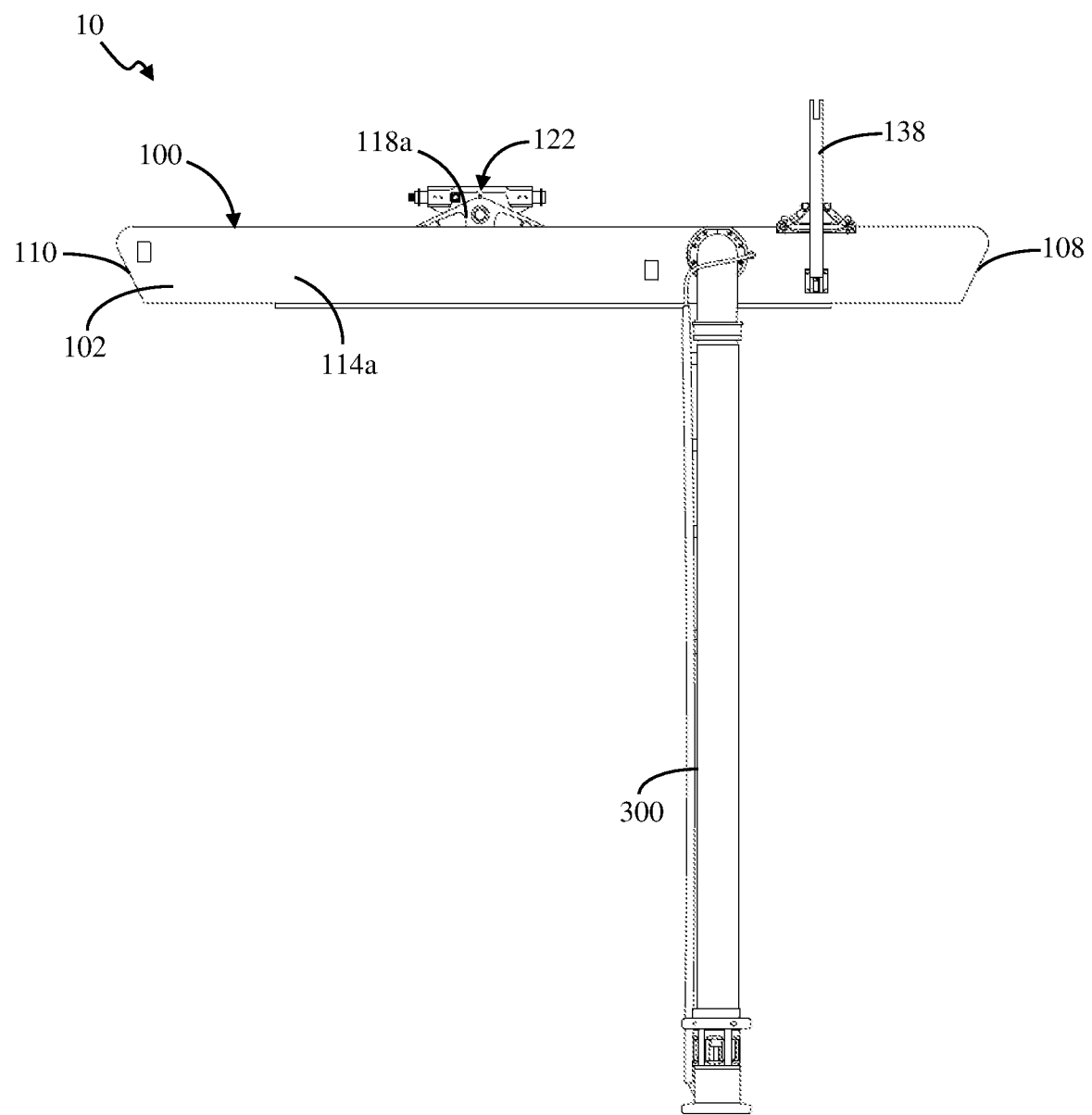
FIG. 6 is a side view of the tank assembly of FIG. 1, with the lower frame structure of the tank assembly being in a first retraction position.
Figure 7:
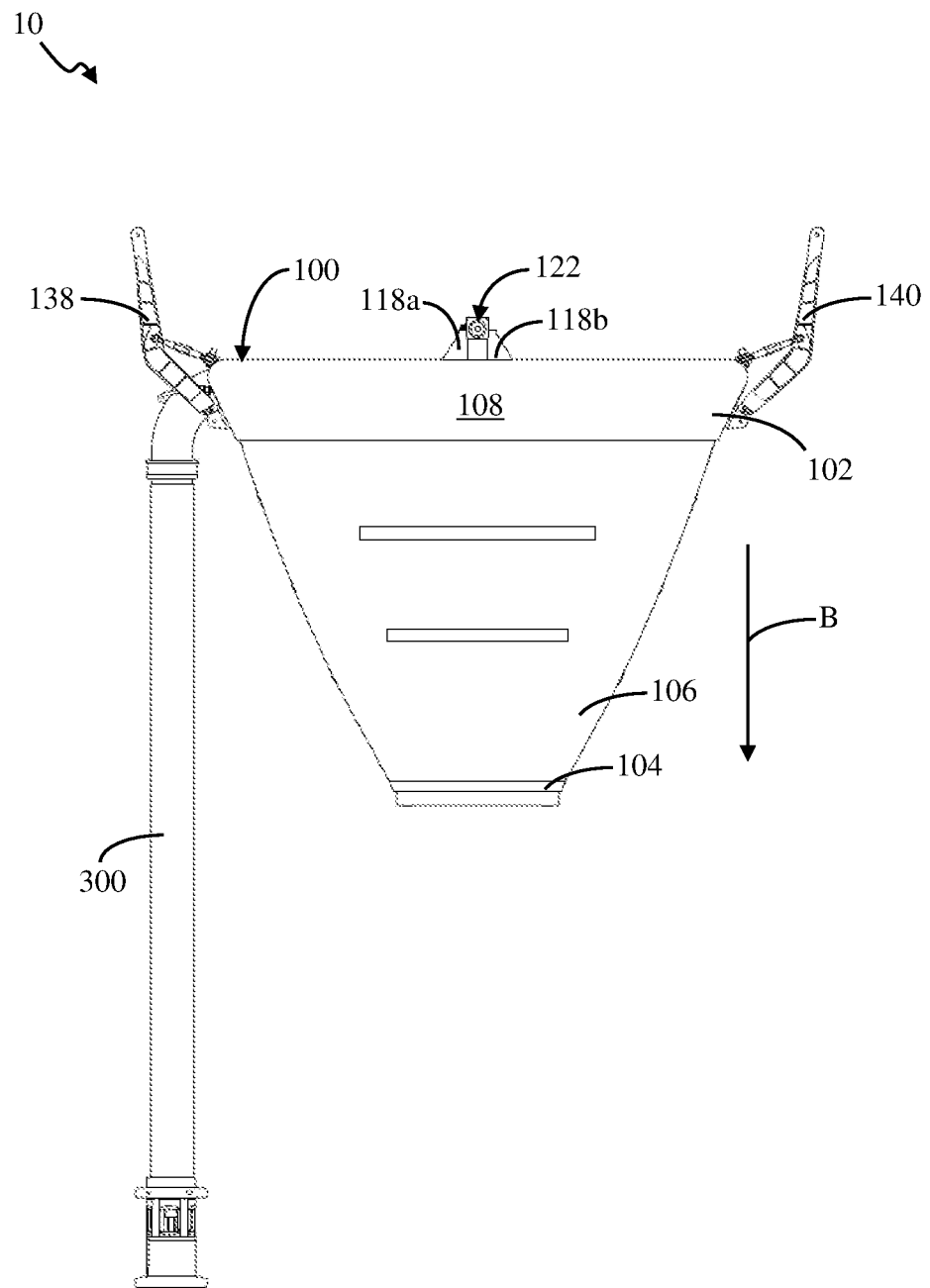
FIG. 7 is a front view of the tank assembly of FIG. 1, with the bomb doors closed.

The lower frame structure 104 is moveable between a first retracted position and a second extended position. In the first retracted position, as shown in FIG. 6, the lower frame structure 104 is substantially within or adjacent the upper frame structure 102 and the flexible bag 106 is collapsed within the upper frame structure 102. The coil spring mechanism 156 of the retraction system 154 biases the lower frame structure 104 to the first retracted position. As liquid or other substances is introduced into the retractable tank 100 via a flexible inlet hose 300, the flexible bag 106 expands to define a volume therein for storing the liquid or other substances. The weight of the liquid or other substances in the flexible bag 106 causes the lower frame structure 104 to move by gravity to the second extended position in the direction B, as shown in FIG. 7. In the second extended position, the lower frame structure 104 is displaced downwardly from the upper frame structure 102. The extent of downward displacement of the lower frame structure 104 from the upper frame structure 102 is dependent on the volume of liquid or other substances stored into the flexible bag 106. Downward displacement of the lower frame structure 104 relative to the upper frame structure 102 also causes tension in the coil spring mechanism 156 of the retraction system 154. In this embodiment, the volume of the flexible bag 106 is about 4,500 litres (1,188 US gallons) when the flexible bag 106 is fully expanded. The plurality of openings 116 in the upwardly-facing surface 112 allows for any overflow of liquid or other substances.

With reference to FIGS. 1 and 2, the tank assembly further comprises two bomb doors 158, 160 that are disposed at or adjacent the lower frame structure 104 for controlling the amount of liquid or other substances to be released from the flexible bag 106. Each of the bomb doors 158, 160 comprises a first end 162, 164 pivotably attached to the lower frame structure 104 and a second opposed free end 166, 168. The bomb doors 158, 160 are pneumatically-operated via a controller (not shown). Each of the bomb doors 158, 160 is movable between a closed position in which the free end 166, 168 is at or substantially adjacent the lower frame structure 104, and an open position in which the free end 166, 168 is displaced downwardly from the lower frame structure 104 to allow the liquid or other substances to be released by gravity from the flexible bag 106. In some embodiments, the bomb doors 158, 160 may be controlled individually or simultaneously by the controller to provide various release patterns depending on fire suppression requirements. For example, the controller may provide Full Open, ½ Open, ⅓ Open or ¼ Open modes. Additionally or optionally, the controller may also provide a Full Open failsafe mode, in which the bomb doors 158, 160 remain open to release all of the liquid or other substances stored in the flexible bag 106 in the event of any electrical faults or an emergency.

Figure 8:
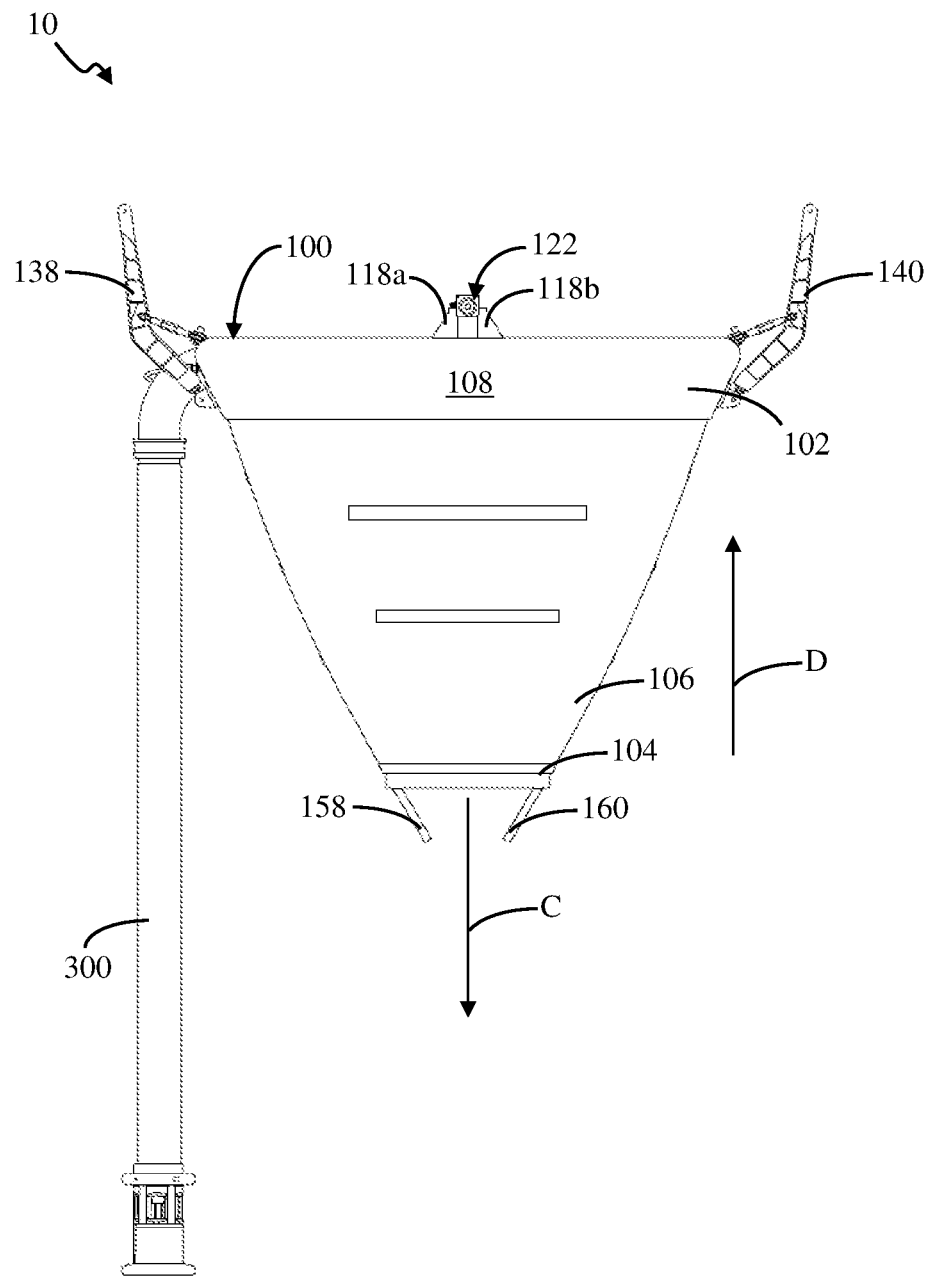
FIG. 8 is a front view of the tank assembly of FIG. 1.

Turning now to FIG. 8, when either of the bomb doors 158, 160 are in the open position and the liquid or other substances is released from the flexible bag 106 in the direction C, the lower frame structure 104 automatically moves upwards in the direction D towards the first retracted position due to the bias of the tension in the coil spring mechanism 156. It will be appreciated that the lower frame structure 104 will remain displaced from the upper frame structure 102 so long as liquid or other substances remain in the flexible bag 106.

Figure 9:
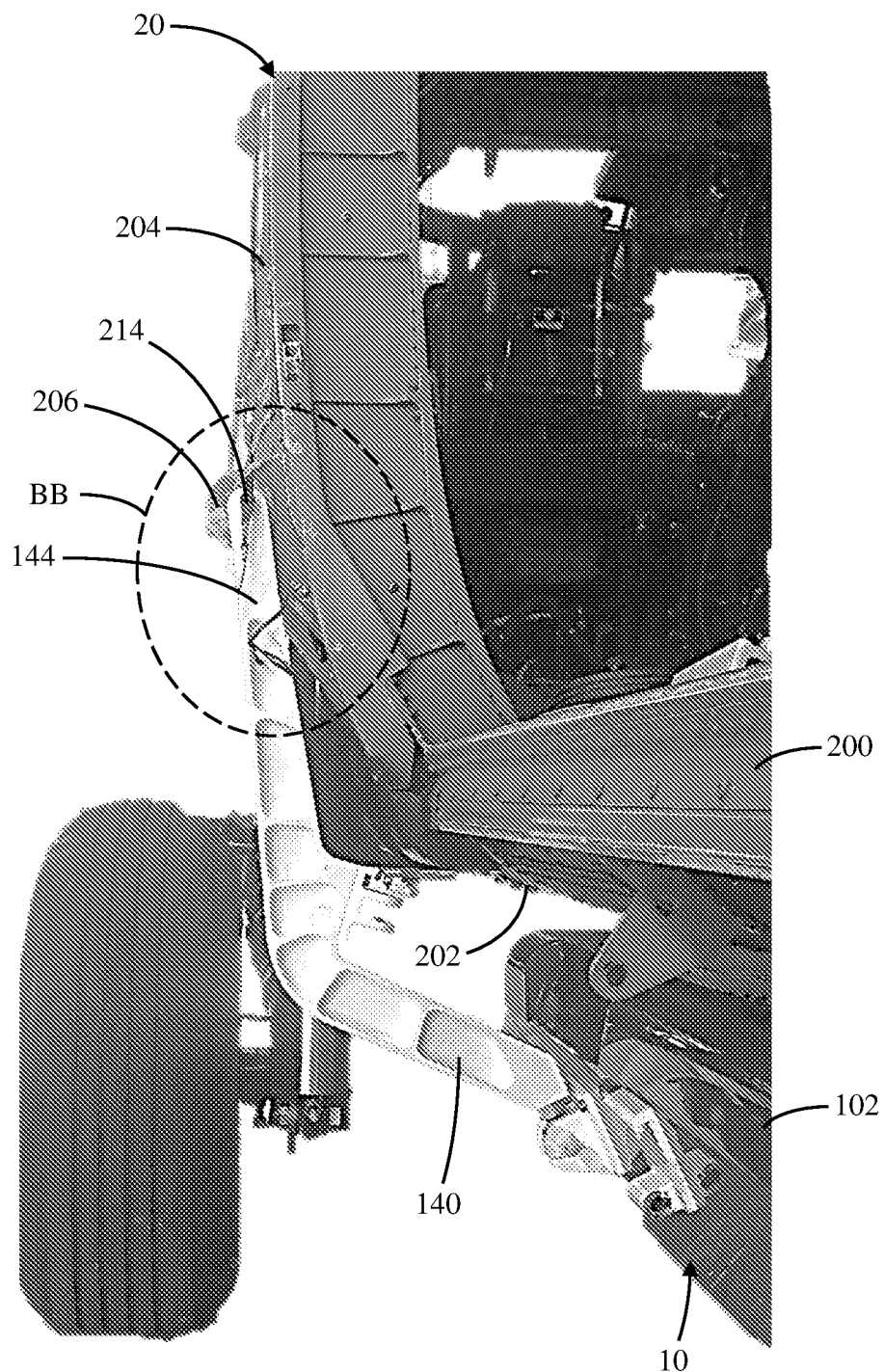
FIG. 9 is a partial rear perspective view of an embodiment of a helicopter with the tank assembly of FIG. 6 attached thereto.
Figure 10:
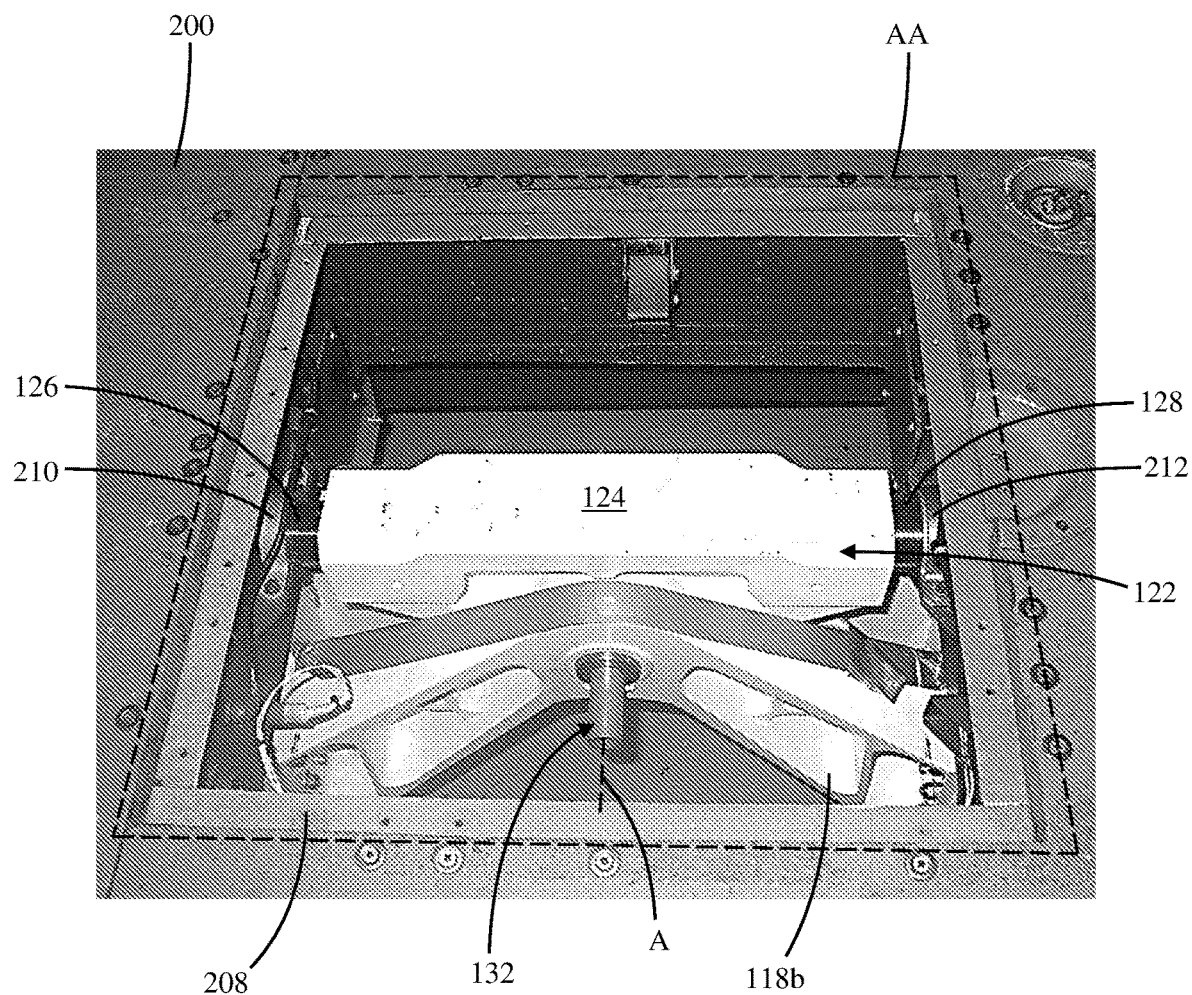
FIG. 10 is a perspective view of a cargo hook mount of the helicopter of FIG. 9.

FIGS. 9 and 10 show an embodiment of a helicopter 20 with the tank assembly 10 attached thereto. The helicopter 20 may be a Black Hawk, for example, the Sikorsky UH-60, S-70, S-70i, S-70A, S-70B, and S-70C, or a Sea Hawk helicopter. The helicopter 20 comprises a fuselage 200 with an underside 202 and opposing sides 204. Two opposing side mounts 206 are disposed respectively on the opposing sides 204 of the fuselage 200. Each of the side mounts 206 is in the form of a mounting lug defining an aperture (not shown). In this embodiment, each of the side mounts 206 is an External Stores Support System (ESSS) mount. A cargo hook mount 208 is also disposed on the underside 202 of the fuselage 200. The cargo hook mount 208 is of the type used for directly mounting a known cargo hook thereon and comprises first and second opposing couplers 210, 212. Each coupler 210, 212 is sized and shaped to receive the respective mounting arm portions 126, 128 of the attachment mechanism 122 therein.

The tank assembly 10 is attached to the helicopter 20 at three locations, that being at the cargo hook mount location AA and the two side mount locations BB. At the cargo hook mount location AA, as shown in FIG. 10, each of the mounting arm portions 126, 128 of the attachment mechanism 122 is fixedly received in respective first and second couplers 212, 214 of the cargo hook mount 210. The attachment mechanism 122 is rotatable relative to the attachment members 118a, 118b about axis A so as to facilitate attachment of the attachment mechanism 122 to the cargo hook mount 210.

At the two side mount locations BB, as shown in FIG. 9, the free end portions 142, 144 of the struts 138, 140 are respectively positioned adjacent the side mounts 206 such that the apertures of the side mounts 206 and the apertures 146, 148 of the free end portions 142, 144 are respectively aligned. In each alignment, a connecting pin (not shown) is received in the aperture of the side mount 206 and the apertures 146, 148 of the free end portion 142, 144, and a fastening mechanism 214 engages the connecting pin thereby securing the respective strut 138, 140 to the side mount 206. A user can move the free end portions 142, 144 relative to the upper frame structure 102 by manipulating the adjustment mechanisms 150, 152 to facilitate positioning of the free end portions 142, 144 adjacent the side mounts 206.

The controller for pneumatically-operating the bomb doors 158, 160 is located onboard the helicopter 20, specifically in the cockpit, to allow a pilot of the helicopter 20 to control the release of liquid or other substances stored in the flexible bag 106.

The embodiments described above has numerous advantages. For example, the tank assembly 10 provides a simple and effective retrofitting solution for improving the firefighting capabilities of Black Hawk helicopters without requiring significant and expensive modifications to be made to the helicopters 20. By utilising the cargo hook mount 208 and two side mounts 206 of the helicopter 20 together, the helicopter 20 is able to achieve a maximum lifting capacity in excess of 9,900 pounds (4,500 kilograms), which is much higher than that for current underslung long-line bucket systems that suspend solely from the cargo hook and thus are limited to the maximum lifting capacity of 8,000 pounds allowed by the cargo hook. The downward load of the stored liquid or other substances on the helicopter 20 is distributed between three locations, that being the cargo hook mount location AA and the two side mount locations BB on the helicopter 20, such that about 80% of the downward load is on the cargo hook mount 208 and about 20% of the downward load is on the two side mounts 206 of the helicopter 20.

The tank assembly 10 is also easy to manufacture and can be easily attached to, and removed from, the helicopter 20. Further, the tank assembly 10 is designed such that it occupies minimal real-estate externally of the helicopter 20, thus not affecting the manoeuvrability and performance of the helicopter 20. For example, the lower frame structure 104 is maintained in the first retracted position so that the retractable tank 100 does not obstruct ground movement of the helicopter 20, and the lower frame structure 104 is moveable to the second extended position to maximise the capacity of the flexible bag 106 when the helicopter 20 is airborne. Fitting the tank assembly 10 external to the helicopter 20 also allows the cargo compartment of the helicopter 20 to be used for other purposes such as transporting persons or cargo.

Further still, the retraction system 154 may be accessed externally by a user for adjustment and servicing via the plurality of openings 116 whilst the tank assembly 10 is attached to the helicopter 20, thus not requiring the tank assembly 10 to be removed from the helicopter 20. Moreover, the funnel shape of the expanded flexible bag 106 increases the head pressure of retractable tank 100 to allow a more effective canopy penetration of the released liquid or other substances for extinguishing fires.

Using pneumatic systems to operate the bomb doors 158, 160 in the above embodiments also provides advantages over hydraulic systems. For example, in hydraulic systems, hydraulic pressures may continually produce errors in the electronics of the tank assembly 10 as constant minor changes in hydraulic pressure limits may cause excessive traffic between solenoids of the tank assembly 10, hydraulic pressure sensors and pilot control systems. These problems may be overcome or ameliorated by using pneumatic systems, rather than hydraulic system, to operate the bomb doors 158, 160.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A tank assembly for a helicopter, the tank assembly comprising:
a retractable tank comprising an upper frame structure, a lower frame structure and a flexible bag for storing liquid or other substances, the flexible bag being connected to the upper and lower frame structures, and the lower frame structure being moveable by gravity from a first retracted position in which the lower frame structure is substantially within or adjacent the upper frame structure, to a second extended position in which the lower frame structure is spaced from the upper frame structure in response to the amount of liquid or other substance in the flexible bag;
an attachment mechanism attached to the upper frame structure and configured to engage a cargo hook mount on the underside of the fuselage of the helicopter; and
first and second struts extending from respective opposing sides of the upper frame structure, each of the first and second struts being configured to engage a respective side mount on the fuselage of the helicopter.

2. The tank assembly according to claim 1, wherein the upper frame structure has a forward end and a rearward end, and
wherein the first and second struts are spaced forwardly from the attachment mechanism.

3. The tank assembly according to claim 1, wherein the attachment mechanism has a body and first and second opposing mounting arm portions extending from the body, each of the first and second opposing mounting arm portions being configured to be fixedly received in respective first and second opposing couplers of the cargo hook mount.

4. The tank assembly according to claim 1, wherein each of the first and second struts is hingedly attached to a respective opposing side of the upper frame structure.

5. The tank assembly according to claim 1, wherein the lower frame structure is biased to the first retracted position.

6. The tank assembly according to claim 5, wherein the lower frame structure is biased to the first retracted position by a retraction system engaged with the upper and lower frame structures.

7. A helicopter comprising:
a fuselage having an underside and opposing sides;
two opposing side mounts disposed respectively on the opposing sides of the fuselage;
a cargo hook mount disposed on the underside of the fuselage; and
a tank assembly comprising:
a retractable tank comprising an upper frame structure, a lower frame structure and a flexible bag for storing liquid or other substances, the flexible bag being connected to the upper and lower frame structures, and the lower frame structure being moveable by gravity from a first retracted position in which the lower frame structure is substantially within or adjacent the upper frame structure, to a second extended position in which the lower frame structure is spaced from the upper frame structure in response to the amount of liquid or other substance in the flexible bag;
an attachment mechanism attached to the upper frame structure and engaged with the cargo hook mount; and
first and second struts extending from respective opposing sides of the upper frame structure, each of the first and second struts being engaged with a respective side mount.

8. The helicopter according to claim 7, wherein the upper frame structure has a forward end and a rearward end, and
wherein the first and second struts are spaced forwardly from the attachment mechanism.

9. The helicopter according to claim 7, wherein the cargo hook mount comprises first and second opposing couplers, and wherein the attachment mechanism has a body and first and second opposing mounting arm portions extending from the body, each of the first and second opposing mounting arm portions being fixedly received in respective first and second opposing couplers.

10. The helicopter according to claim 7, wherein each of the first and second struts is hingedly attached to a respective opposing side of the upper frame structure.

11. The helicopter according to claim 7, wherein each of the side mounts defines an aperture, and wherein a free end portion of each of the first and second struts defines at least one aperture.

12. The helicopter according to claim 11, further comprising two or more fasteners for securing the first and second struts to respective side mounts, wherein the apertures of the first and second struts and the apertures of the side mounts are respectively aligned and secured by respective fasteners.

13. The helicopter according to claim 7, wherein each of the side mounts is an External Stores Support System (ESSS) mount.

14. The helicopter according to claim 7, wherein the helicopter is a Black Hawk or Sea Hawk helicopter.

15. The helicopter according to claim 7, wherein the lower frame structure is biased to the first retracted position.

16. The helicopter according to claim 15, wherein the lower frame structure is biased to the first retracted position by a retraction system engaged with the upper and lower frame structures.

* * * * *